(12) United States Patent
Chiang

(10) Patent No.: US 8,515,318 B2
(45) Date of Patent: Aug. 20, 2013

(54) HIGH CONDUCTIVE, SOFT URETHANE ROLLERS

(75) Inventor: Albert C. Chiang, Ledyard, CT (US)

(73) Assignee: Mearthane Products Corporation, Cranston, RI (US)

( * ) Notice: Subject to any disclaimer, the term of this patent is extended or adjusted under 35 U.S.C. 154(b) by 200 days.

(21) Appl. No.: 13/045,011

(22) Filed: Mar. 10, 2011

(65) Prior Publication Data

US 2011/0274469 A1 Nov. 10, 2011

Related U.S. Application Data

(60) Provisional application No. 61/312,923, filed on Mar. 11, 2010.

(51) Int. Cl.
  *G03G 15/08* (2006.01)
  *G03G 15/00* (2006.01)
  *H01B 1/12* (2006.01)
  *B32B 1/08* (2006.01)
  *B32B 27/40* (2006.01)

(52) U.S. Cl.
  USPC ....... 399/258; 492/59; 428/36.91; 428/425.8; 428/425.9; 252/519.33; 528/48; 528/59

(58) Field of Classification Search
  USPC ............. 399/258; 492/59; 428/425.8, 425.9; 428/36.91; 252/519.33; 528/48, 59
  See application file for complete search history.

(56) References Cited

U.S. PATENT DOCUMENTS

| | | | | |
|---|---|---|---|---|
| 4,622,361 A | * | 11/1986 | Gill et al. | 524/710 |
| 4,857,561 A | | 8/1989 | Mafoti et al. | |
| 6,352,771 B1 | * | 3/2002 | Chiang et al. | 428/364 |
| 6,780,364 B2 | | 8/2004 | Chiang et al. | |
| 7,056,976 B2 | * | 6/2006 | Joshi et al. | 524/590 |
| 2006/0019101 A1 | | 1/2006 | Lee | |
| 2010/0266799 A1 | * | 10/2010 | Koonce et al. | 428/36.9 |
| 2011/0186329 A1 | * | 8/2011 | Makal et al. | 174/113 R |

FOREIGN PATENT DOCUMENTS

| | | |
|---|---|---|
| DE | 102008054940 A1 | 7/2009 |
| WO | WO2011112806 A1 | 9/2011 |

OTHER PUBLICATIONS

International Preliminary Report on Patentability; Jul. 4, 2012; World Intellectual Property Organization (WIPO) (International Bureau of); PCT/US2011/027889; 7 pages.
PCT/US2011/027889 International Search Report and Written Opinion, PCT, Jun. 22, 2011, 11 pages.

* cited by examiner

*Primary Examiner* — Thao T. Tran
(74) *Attorney, Agent, or Firm* — Fish & Richardson P.C.

(57) ABSTRACT

Rollers for high speed printers and paper handling devices are fabricated by reacting polymeric diphenylmethane diisocyanate with a polyester polyol and/or polyester polyamine and an optional extender, together with a metal salt, a catalyst, and one or more other optional additives, including a liquid conductive additive. The resulting rollers provide a hardness as low as 15 A on cube, a resistivity as low as 5E4 Ω·cm, a compression set as low as 0.5% at room temperature and as low as 3% at 157° F., and low tackiness as low as 13 g/cm of adhesion force.

19 Claims, 2 Drawing Sheets

HIGH CONDUCTIVE, SOFT URETHANE ROLLERS

CROSS-REFERENCE TO RELATED APPLICATION

This application claims priority to U.S. Application Ser. No. 61/312,923, filed on Mar. 11, 2010, which is incorporated by reference herein in its entirety.

FIELD OF THE INVENTION

This invention relates to high conductive, low hardness, low compression set, low tackiness urethane rollers for printer and paper handling devices.

BACKGROUND

A laser printer often includes a toner cartridge and paper handling components. The toner cartridge can include a digital light emitter, photoconductor drum, a charge roller, a developer roller, a developer blade, a toner transfer roller, a toner storage unit, and a paper handling roller. The paper handling roller can include an exit roller and a fuser roller. During printing, the toner transfer roller supplies toner to the developer roller, and the developer blade forms the toner into a thin, even layer on the surface of the developer roller. The charge roller charges the photoconductive drum with a negative charge. After the photoconductive drum has been exposed to a light emitter, the surface of the photoconductor drum forms an electrostatic latent image, and the developer roller transfers toner to the portion of the drum surface to form the toner image. The laser printer may also include a toner-removal wiper that removes excess toner from the surface of the developer roller after the developer roller has contacted the photoconductor drum. The toner on the drum subsequently is transferred to paper, and then fuses to form the print.

The developer roller is cylindrical and typically includes a central shaft surrounded by a synthetic rubber or urethane elastomer portion. U.S. Pat. Nos. 6,352,771 and 6,780,364 to Chiang et al., both of which are incorporated by reference herein in their entirety, describe developer rollers fabricated with a conductive urethane formed by dissolving metal salts in urethane precursors including polyether polyols and/or polyether polyamines and then reacting the urethane precursors with diphenylmethane diisocyanate. The resulting urethane has a resistivity between 1E6 Ω·cm (i.e., 1×10$^6$ Ω·cm) and 9E8 Ω·cm (i.e., 9×10$^8$ Ω·cm) and a hardness between 30 Shore A and 50 Shore A on cube.

SUMMARY

In a first aspect, a conductive thermoset urethane is formed from a mixture including a polymeric diphenylmethane diisocyanate, a soft segment including a polyester polyol, a polyester polyamine, or a combination thereof, and a metal salt. The conductive thermoset urethane has a compression set of less than about 5% at room temperature.

In a second aspect, a roller for a printing or paper handling device includes a conductive metal core, and the conductive thermoset urethane of the first aspect formed around the conductive metal core. The roller may be, for example, a developer roller, charge roller, exit roller, toner add roller, or bias transport roller.

Implementations may include one or more of the following features.

The conductive thermoset urethane may further include a hard segment including a polyol, a polyamine, or a combination thereof. In some cases, the hard segment is selected from the group consisting of a polyol, a polyamine, or a combination thereof. An equivalent weight of the hard segment is less than about 200. An equivalent weight of the soft segment is at least about 900. In some cases, the soft segment is selected from the group consisting of a polyester polyol, a polyester polyamine, or a combination thereof. A weight ratio of the soft segment to the hard segment in the mixture is at least about 100, or at least about 200.

The mixture may further include a liquid conductive additive. The liquid conductive additive may be a solution including an additional metal salt in a solvent. The solvent may have a high polarity and/or a high boiling point (e.g., above 200° F., above 250° F., above 300° F., or above 350° F. at atmospheric pressure). Suitable solvents include, for example, tris(2-butoxyethyl phosphate) (TBEP), tri(β-chloroethyl) phosphate (CEF), and tri(β-chloropropyl) phosphate (PCF). Suitable additional metal salts include, for example, lithium perchlorate, copper(II) chloride, and iron(III) chloride. An amount of the additional metal salt in the liquid conductive additive may be between about 1 wt % and about 20 wt %.

The metal salt can be an alkali metal salt or a transition metal salt. In some cases, the metal salt is an alkali metal salt. The alkali metal salt may be an alkali perchlorate salt. The alkali perchlorate salt may be, for example, lithium perchlorate. A total weight percentage of the metal salt, and the additional metal salt if present, in the conductive urethane is between about 0.1 wt % and about 8 wt %, or between about 0.2 wt % and about 5 wt %.

The compression set of the conductive thermoset urethane is as low as about 0.5%. For example, the compression set of the conductive thermoset urethane can be between about 0.5% and about 5% at room temperature, or between about 0.5% and about 3% at room temperature. The compression set of the conductive thermoset urethane can be as low as 3% at 157° F.

The hardness of the conductive thermoset urethane is as low as about 15 Shore A on cube. For example, the hardness of the conductive thermoset urethane can be between about 15 Shore A and about 30 Shore A on cube. In some cases, the hardness of the conductive thermoset urethane is between about 20 Shore A and about 30 Shore A on cube.

The volume resistivity of the conductive thermoset urethane can be as low as 5E4 Ω·cm. For example, the volume resistivity of the conductive thermoset urethane can be between about 5E4 Ω·cm and about 9E5 Ω·cm. In some cases, the volume resistivity of the conductive thermoset urethane is between about 8E4 Ω·cm and about 6E5 Ω·cm.

The adhesion force of the conductive thermoset urethane is less than about 50 g/cm, or between about 5 g/cm and about 30 g/cm. In some cases, the adhesion force of the conductive thermoset urethane is between about 5 g/cm and about 20 g/cm.

The conductive thermoset urethanes described herein exhibit high electrical conductivity, low hardness, low compression set, and low tackiness. Features described herein may be combined to form urethanes with a range of desirable properties. For example, rollers fabricated from the conductive thermoset urethanes described herein may yield rollers with a hardness as low as about 15 A on cube, a resistivity as low as about 5E4 Ω·cm, a compression set as low as about 0.5% at room temperature and as low as about 3% at 157° F., and a tackiness as low as about 13 g/cm of adhesion force.

These properties contribute to reduced deformation in roller dimensions, as well as better toner transfer on paper, better print quality and resolution at higher print speeds, and faster roller dimension recovery after each image transfer cycle. Rollers formed from this conductive thermoset urethane are suitable for black/white and color laser printers using a low melting point toner with a particle size of less than about 6 μm for high speed laser printers (e.g., laser printers with a print speed greater than 20 pages per minute).

DETAILED DESCRIPTION

As described herein, rollers for printers and paper handling devices include developer rollers, charge rollers, exit rollers, toner add rollers, and bias transport rollers. The rollers include high conductive, low hardness, low compression set, low tackiness urethane formed by reacting polymeric diphenylmethane diisocyanate (polymeric MDI, isocyanate number greater than about 23) with a soft segment including a polyester polyol, a polyester polyamine, or a combination thereof (equivalent weight greater than about 900) and an optional hard segment (i.e., an extender) including a polyol, a polyamine, or a combination thereof (equivalent weight less than about 200), together with a metal salt, catalyst, and optional additives. The resulting rollers demonstrate a soft hardness (e.g., as low as about 15 Shore A, or between about 15 Shore A and about 30 Shore A on cube or between about 25 Shore A and about 40 Shore A on roller) and a high conductivity or low resistivity (e.g., as low as about 5E4 Ω·cm, or between about 5E4 Ω·cm and about 9E5 Ω·cm). These rollers are suitable for high speed printers and paper handing devices. In particular, rollers as described herein are suitable for black/white and color laser printers using a low melting point toner with a particle size of less than about 6 μm for high speed laser printers (e.g., laser printers with a print speed greater than 20 pages per minute).

Figure 1:
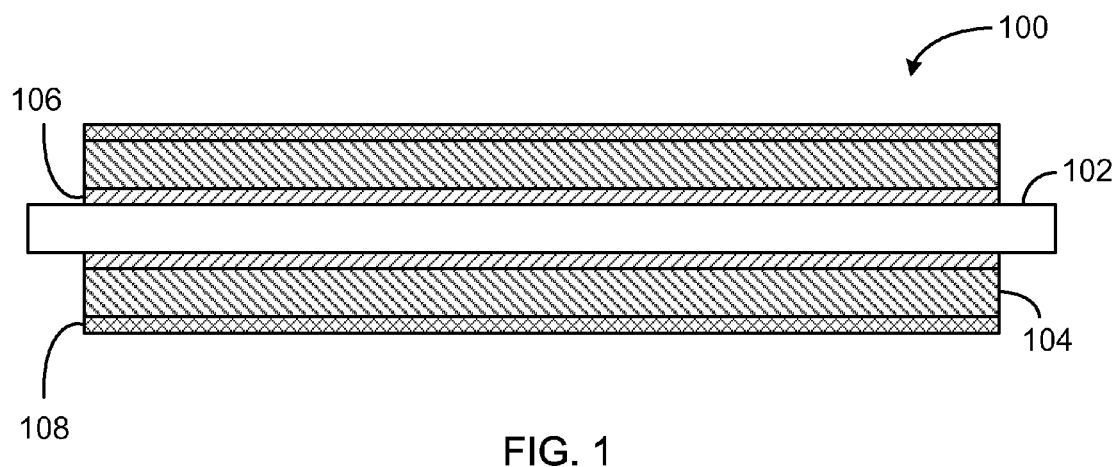
FIG. 1 illustrates a cross section of a roller for use with a printing or paper handling device.

Referring to FIG. 1, a roller 100 includes a shaft 102 surrounded by solid conductive thermoset urethane portion 104. Roller 100 may be, for example, a developer roller, exit roller, charge roller, toner add roller, or bias transport roller. Shaft 102 can be made of steel (e.g., stainless steel or nickel-plated steel), aluminum, conductive plastic, pultrusion conductive rod, or any other material suitable for the shaft of the roller. In some cases, at least a portion of shaft 102 is coated with a conductive adhesive 106 to promote adhesion of solid conductive thermoset urethane portion 104 to the shaft. The conductive adhesive coating 106 may have a thickness between about 2.5 μm and about 25 p.m. Top coating 108 may be applied to the solid thermoset urethane portion 104 after additional processing (e.g., rough grinding and finish grinding) of the solid thermoset urethane portion. The top coating 108 may include, for example, a moisture cure urethane or a silicone rubber. A thickness of the top coating 108 may be in a range between about 10 μm and about 25 μm.

The urethane formulations described herein, including polymeric MDI and soft segment polyester polyols and/or polyester polyamines, yield extra soft hardness rollers with low tackiness and low compression set. These properties result at least in part from the use of polyester polyols and/or polyester polyamines as the soft segment, and a high ratio of the soft segment polyester polyol or polyester polyamine to the hard segment polyol or polyamine, if present. In addition, the high degree of crosslinking between the polymeric MDI, the high equivalent weight soft segment polyester polyol and/or polyester polyamine, and the low equivalent weight hard segment polyol or polyamine, if present, contribute to the high conductivity (or low resistivity), low compression set, and low tackiness of the resulting urethane.

Electron donors in the polyurethane precursors (e.g., the polymeric MDI, the soft segment polyester polyols and/or polyester polyamines, and the hard segment polyols and/or polyamines, if present), including unsaturated bonds such as C=C, C=C—C=C, C=O, and C=S, and polar bonds such as C—NH— and —C—O—, interact with the metal salt to form complexes including the metal salt and the polyurethane precursors. These complexes further enhance the electrical conductivity of the urethane. A higher isocyanate number of the polymeric MDI, a higher hydroxyl number or equivalent weight of the polyester polyols and polyester polyamines, a higher number of polar groups in the hard segment polyols or polyamines, or any combination thereof, also contribute to an increased electrical conductivity of the resulting urethane.

Suitable polymeric MDIs have an isocyanate number (NCO) (or NCO weight percentage) of greater than about 23, or greater than about 25. Examples of suitable polymeric MDIs include LUPRANATE 241, LUPRANATE 230, LUPRANATE 245, LUPRANATE TF2115, LUPRANATE 234, LUPRANATE 273, LUPRANATE 266, LUPRANATE 261, LUPRANATE 255, LUPRANATE 268; LUPRANATE 5010, and LUPRANATE 2, all available from BASF Corporation (Wyandotte, Mich.). Other suitable polymeric MDIs include, for example, MONDUR MR-LIGHT, MONDUR MR, MONDUR MRS, MONDUR 489, MONDUR 582, MONDUR MRS-5, MONDUR MR-5, MONDUR MRS-4, MONDUR MRS-200, MONDUR MRS-2, MONDUR ENC-88, MONDUR ENC-5003, and MONDUR ENC-5006, all available from Bayer Material Science LLC (Pittsburgh, Pa.), and PAPI 20, PAPI 27, PAPI 50, PAPI 94, PAPI 105, PAPI 135, PAPI 580, and PAPI 901, all available from The Dow Chemical Company (Midland, Mich.).

Suitable polyester polyols have an equivalent weight greater than about 900 and include, for example, DESMOPHEN F-2403, DESMOPHEN F-2408, DESMOPHEN F-2502, DESMOPHEN F-207-60A, DESMOPHEN 2100KS, DESMOPHEN 2000, DESMOPHEN 1800, DESMOPHEN F-2501, DESMOPHEN F-2500, DESMOPHEN P100B, DESMOPHEN 2601, DESMOPHEN 2602, DESMOPHEN F-PE225B, DESMOPHEN 2002H, DESMOPHEN F-2003E, and DESMOPHEN PE65B, all available from Bayer MaterialScience LLC, and PIOTHANE 3500 DEA available from Panolam Industries International, Inc. (Shelton, Conn.). Suitable polyester polyamines include VERSALINK P-2000, VERSALINK P-2500, and VERSALINK P-3000 from Air Products (Allentown, Pa.). The soft segment polyol and/or polyamine may include one or more polyester polyols, one or more polyester polyamines, or any combination thereof. In some cases, the soft segment polyol or polyamine consists essentially of one or more polyester polyols, one or more polyester polyamines, or any combination thereof.

Suitable hard segment polyols and polyamines (i.e., extenders) include, for example, butanediol, propanediol, pentadiene, triisopropylamine (TIPA), trimethanol propane (TMP), Isonol-93, and hydroquinone bis(2-hydroxyethyl) ether (HQEE). Butanediol (e.g., butanediol BDO or XB) is available, for example, from GAF Chemical Corporation (Wayne, N.J.). TMP is available, for example, from Celanese Corporation (Dallas, Tex.). TIPA and Isonol-93 are available, for example, from The Dow Chemical Company. HQEE is available, for example, from Eastman Chemical Co. (Kingsport, Tenn.). Hexanediol is available, for example, from Sigma-Aldrich Corp. (St. Louis, Mo.). The hard segment polyol or polyamine may include one or more polyols, one or more polyamines, or a mixture thereof.

A sufficient amount of the soft segment polyester polyol and/or polyester polyamine may be used in forming the urethane to provide a thermoset urethane with a hardness of about 15 Shore A to about 30 Shore A on cube. For example, a weight ratio of the soft segment polyester polyol and/or polyester polyamine to the hard segment polyol and/or polyamine, if present, is at least about 100, or at least about 200.

Examples of suitable metal salts include alkali metal salts, such as perchlorates (e.g., lithium perchlorate, sodium perchlorate, and potassium perchlorate, available from Sigma-Aldrich Chemical) and halides (e.g., lithium chloride and potassium chloride). In some cases, transition metal salts, such as copper(II) chloride, and iron(III) chloride from Sigma-Aldrich may also be suitable. Other examples of suitable metal salts include alkali organic metal salts, such as lithium (bis) trifluoromethanesulfonimide (available as FLUORAD HQ-115 from 3M (St. Paul, Minn.)) may also be suitable.

In some cases, the conductive thermoset urethane includes an additional conductive additive. The additional conductive additive may be added in the form of a liquid to increase the conductivity (or lower the resistivity) of the conductive thermoset urethane. The liquid may be a solution including an additional metal salt in a solvent. The solvent may have a high polarity and/or a high boiling point (e.g., above 200° F., above 250° F., above 300° F., or above 350° F. at atmospheric pressure). Suitable solvents include flame retardants such as, for example, tris(2-butoxyethyl phosphate) (TBEP), tri($\beta$-chloroethyl) phosphate (CEF), and tri($\beta$-chloropropyl) phosphate (PCF), available from Akzo Nobel Chemicals Inc. (Chicago, Ill.). Suitable additional metal salts include alkali metal salts or transition metal salts. An example of a suitable alkali metal salt is lithium perchlorate. Examples of suitable transition metal salts include copper(II) chloride and iron(III) chloride. An amount of the additional metal salt in the liquid conductive additive may be between about 1 wt % and about 20 wt %. Examples of liquid conductive additives include 10 wt % lithium perchlorate, 5 wt % copper(II) chloride, and 10 wt % iron(III) chloride in TBEP, CEF, or PCF.

The conductive thermoset urethane can include, for example, a total of between about 0.1 wt % and about 8 wt %, or between about 0.2 wt % and about 5 wt %, of the metal salt (including any additional metal salt in the form of the additional conductive additive) to achieve high conductivity with a volume resistivity as low as 5E4 $\Omega\cdot$cm, or in a range between about 5E4 $\Omega\cdot$cm and 9E5 $\Omega\cdot$cm.

A catalyst used in forming the conductive thermoset urethane may include tin. Examples of catalysts that can be used in forming the urethane include FOMREZ UL-32 and FOMREZ UL-29, available from Witco (Taft, La.); and DABCO T-12, DABCO T-9, and DABCO 33LV, available from Air Products. The conductive thermoset urethane may include, for example, between 0.001 wt % and 0.1 wt % of the catalyst.

UV light stabilizers and antioxidants inhibit oxidation and light degradation at the surface of a roller formed as described herein. Examples of UV light stabilizers that can be used include TINUVIN P, TINUVIN C353 FF, TINUVIN 111 FB, TINUVIN 111 FDL, TINUVIN 123, TINUVIN 144, TINUVIN 213, TINUVIN 234, TINUVIN 326, TINUVIN 327, TINUVIN 328, TINUVIN 622LD, TINUVIN 765, TINUVIN 770 DF, TINUVIN 783FB, TINUVIN 783FD, TINUVIN 783FDL, UVITEX OB, and CHIMASSORB 81, CHIMASSORB 119FL, CHIMASSORB 944 LD/FL, all available from Ciba (BASF Corporation, Florham Park, N.J.). The conductive thermoset urethane may include, for example, between about 0.05 wt % and about 5 wt %, or between about 0.5 wt % and about 2 wt % of the stabilizer. Examples of antioxidants include IRGANOX 245, IRGANOX 1010, IRGANOX 1076, IRGANOX 1098, IRGANOX 1135, IRGANOX 5057, and BHT, all available from Ciba (BASF Corporation). The conductive thermoset urethane may include, for example, between about 0.01 wt % and about 3 wt %, or between about 0.1 wt % and about 2 wt % of the antioxidant.

Hydrolysis stabilizers inhibit urethane reversion degradation (e.g., hydrolysis) at the surface of a roller formed from the urethane described herein. Examples of hydrolysis stabilizers include STABAXOL P200, STABAXOL I, STABAXOL P100, STABAXOL P, STABAXOL ILF, STABAXOL K7646, STABAXOL KE8059, and STABAXOL KE9655, all available from Rhein Chemie Rheinaur GmbH (Mannheim, Germany). The thermoset urethane may include between about 0.1% and about 10%, or between about 0.5% and about 5% of the hydrolysis stabilizers by weight.

Examples of the top coating applied to the conductive thermoset urethane portion of a roller include CHEMGLAZE Z-306, a moisture cure urethane available from Lord Corporation (Erie, Pa.) and IHMPIMPCRKIT 350, a moisture cure silicone available from Deinze, Belgium.

Figure 2:
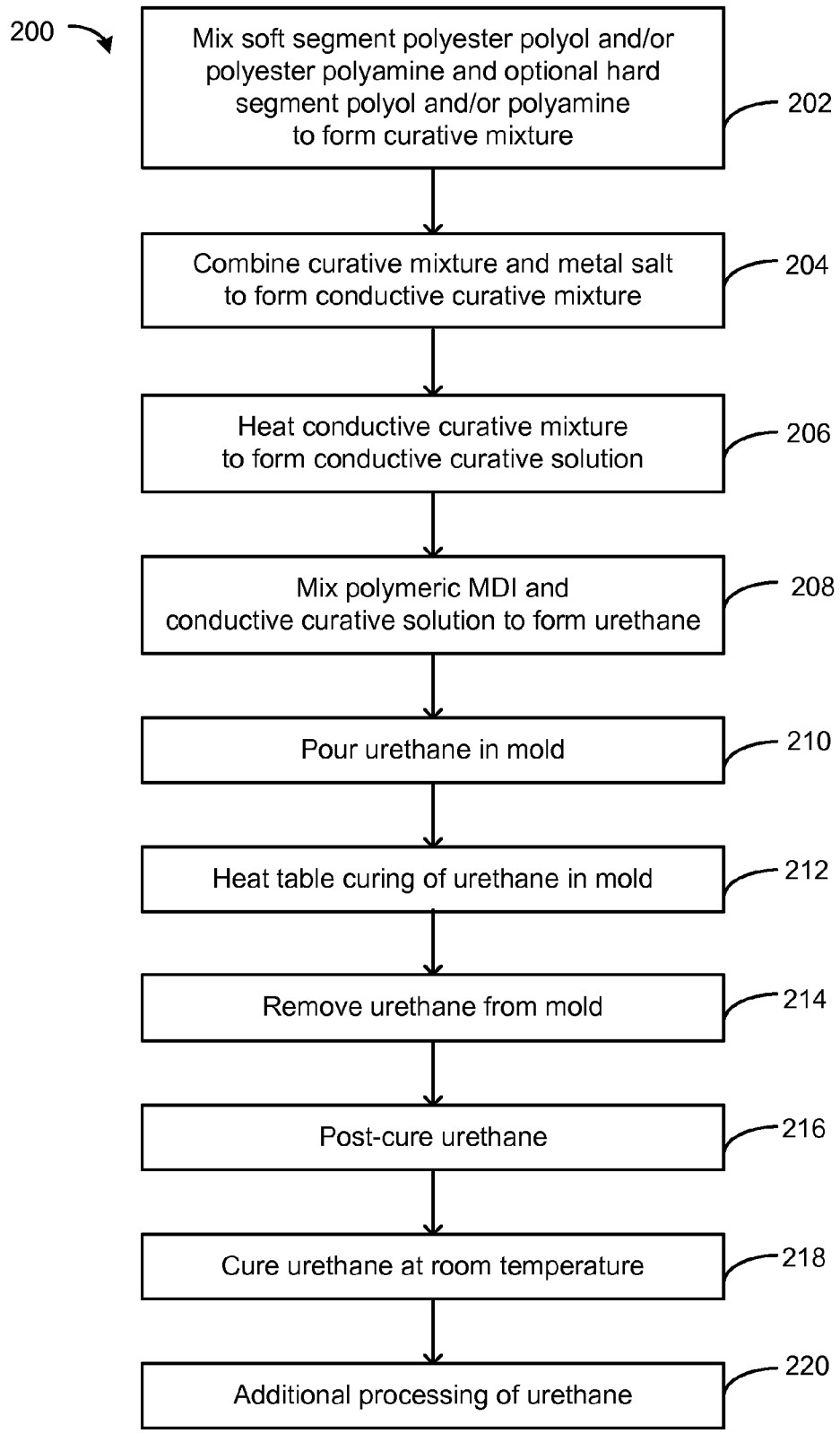
FIG. 2 is a flow chart showing steps in the fabrication of a roller for use with a printing device or paper handling device.

Rollers, including developer rollers and other rollers such as exit rollers, charge rollers, toner add rollers, bias transport rollers, and the like, may be formed by a process including preparation of a conductive curative mixture, and reaction of the conductive curative mixture with polymeric diphenylmethane diisocyanate (polymeric MDI). FIG. 2 illustrates a process 200 for forming a roller 100. In step 202, soft segment polyester polyol and/or polyester polyamine, an optional hard segment polyol and/or polyamine, and a catalyst are added together and mechanically mixed to form a curative mixture. The weight ratio of the soft segment polyester polyol and/or polyester polyamine to the combined weight of the hard segment polyol and/or polyamine, if present, and catalyst is at least about 100, or at least about 200.

In step 204, a metal salt is added to the curative mixture to form a conductive curative mixture. The conductive curative mixture may be heated, for example, at about 220° F. for two hours under stirring at 300 rpm.

In some cases, the metal salt may be at least partially dissolved in a portion of the soft segment, the hard segment/catalyst mixture, or a mixture thereof before being combined with additional soft segment and/or hard segment/catalyst mixture. This may be accomplished, for example, by heating a mixture including the metal salt and the soft segment and/or the hard segment/catalyst mixture at an elevated temperature (e.g., about 180° F. to about 240° F., or about 200° F. to about 220° F.) for a length of time (e.g., at least about 2 hours, or between about 2 hours and about 4 hours). Heating may occur under vacuum drying during compounding. In other cases, steps 202 and 204 may be combined, such that the soft segment, the hard segment/catalyst mixture, the metal salt, and the additional conductive additive (if present), are mixed together in one step to form the conductive curative mixture. In certain cases, other optional additives, such as a UV light stabilizer, antioxidant, hydrolysis stabilizer, or any combination thereof, may be added to the curative mixture and/or to the conductive curative mixture.

In step 206, the conductive curative mixture is heated to dissolve the metal salt, and other additives if present, in the curative mixture to form a conductive curative solution. Heating may include heating to a temperature between about 180° F. and about 240° F., or to a temperature between about 200° F. and about 220° F., for a length of time between about 1 hour and about 4 hours, or for a length of time between about 1.5 hours and about 2.5 hours. In an example, forming the conductive curative solution includes heating the conductive curative mixture at a temperature between about 220° F. and about 240° F. for a length of time between about 2 hours and about 4 hours.

In step 208, polymeric MDI with an isocyanate number greater than 23 or greater than 25 is mixed with the conductive curative solution formed in step 206. Mixing can include, for example, high shear mixing. The mixing may occur in a metering machine (e.g., from Max Machinery, Inc., Healdsburg, Calif.). The total flow rate of the polymeric MDI and the conductive curative solution may be between about 100 g/min and about 1500 g/min (e.g., between about 500 g/min and about 1300 g/min). At the time of mixing, the temperature of the polymeric MDI is between about 90° F. and about 120° F., and the temperature of the conductive curative solution from step 206 is between about 180° F. and about 200° F. The elevated temperatures help maintain a suitable viscosity for mixing. A total amount of metal salt in the final urethane product (including the additional conductive additive if present) is in a range between about 0.1 wt % and about 8 wt % (e.g., between about 0.2 wt % and about 5 wt %).

In step 210, the urethane from step 208 is poured into a mold. The urethane may be poured with a computer-aided metering machine (e.g., from Max Machinery, Inc.). In some cases, the mixing referred to in step 208 may occur in the mold, such that the conductive curative solution continuously reacts with the polymeric MDI in the mold. In some cases, the roller is prepared by combining the appropriate urethane precursors and other ingredients in a tube or shaft mold that includes a prepared metal shaft. Preparation of the shaft may include coating with a conductive adhesive, baking (e.g., at a temperature between about 240° F. and about 260° F.) for a length of time (e.g., between about 2 hours and about 3 hours), and cooling to room temperature. The shaft can be, for example, rod-shaped or a circular tube. The mold can be U-shaped, rectangular, square, or circular. The molding procedure can include, for example, vertical or horizontal casting, spin casting, a centrifugal method, rotational coating, or an extrusion or pultrusion process.

A conductive adhesive suitable for coating a metal shaft for use in the rollers described herein may promote adhesion of the conductive thermoset urethane to the shaft, and may also inhibit corrosion of the metal shaft. A suitable conductive adhesive includes, for example, a mixture of 100 parts by weight EMB C200-91-FR (an adhesive) available from Engineered Materials Systems, Inc. (Delaware, Ohio), 9 parts by weight magnesium powder, and 0.25 parts by weight DABCO DC-190 (a silicone surfactant), available from Air Products.

In step 212, the urethane in the mold is subjected to heat table curing. In an example, the duration of the heat table curing may be between about 10 minutes and about 45 minutes (e.g., between about 10 minutes and about 20 minutes). A temperature of the heat table curing may be between about 00° F. and about 200° F. (e.g., about 170° F.). After heat table curing, the rollers are removed from the mold in step 214. In step 216, the rollers are placed in the heating oven for post-curing between about 140° F. and about 220° F. (e.g., between about 180° F. and about 200° F.) for a length of time between about 6 hours and about 24 hours (e.g., between about 8 hours and about 16 hours, between about 8 hours and about 12 hours, or between about 12 hours and about 16 hours). The post-cured rollers from step 216 may be cured at room temperature in step 218. Room temperature may include, for example, a temperature in a range between about 60° F. and about 95° F. The room temperature curing in step 218 may last a day or more. In some cases, the rollers are cured at room temperature for 2 to 3 days before further fabrication. The rollers may achieve a maximum conductivity after about two to three weeks of curing at room temperature.

After curing at room temperature, the rollers undergo additional fabrication processing in step 220 to provide a final roller with specified dimensioning, resistivity, surface roughness, total indicator reading, crown, straightness, circularity, and the like, for use as conductive rollers. The additional fabrication processing may include, for example, rough grinding, finishing grinding, top coating (e.g., with urethane or silicone), superfinishing, or a combination thereof. The top coating may be applied, for example, by kiss coating, spray coating, or dip coating. The finished roller may have a surface roughness, Ra, between about 0.2 µm and about 0.8 µm, or between about 0.2 µm and about 0.5 µm. The durometer and volume resistivity of the cubes may be measured with a Shore hardness meter (available, for example, from Instron Corporation, Canton, Mass.) and a Keithley 8008 Resistivity Test Fixture (Keithley Instruments, Inc., Cleveland, Ohio), respectively.

At the same time rollers 100 are being formed by process 200, urethane cubes may also be prepared by substantially the same process, without a conductive core, in a different mold. The urethane cubes may be used for "on cube" measurements of hardness and resistivity. In an example, cubes having the size 1"×1"×1.3" are poured, de-molded, and cured along with the rollers. After post-curing and curing at room temperature, the durometer and volume resistivity of the cubes may be measured.

Other physical properties such as tensile strength, elongation, tear strength, compression set, compression modulus, tensile modulus, and Bashore rebound are measured, from the ASTM sheets, 12"×12"×⅛", for example, with equipment available from Instron (Norwood, Mass.) according to ASTM methods D412, D624, D395B, D2240, D2632, and D575.

EXAMPLES

Thermoset urethane rollers were prepared with a computer-aided metering machine available from Max Machinery, Inc., with four tanks equipped with temperature control, pressure control, high vacuum, and flow rate control. Table I lists the temperature (° F.) and flow rate (g/min) for the diisocyanates in Stream B1 (MONDUR MR, or other polymeric MDI) and Stream B2 (conductive curative/polyester polyol/polyester polyamine solutions shown in Table II). The total flow rate or streams B1 and B2 for Examples 1-8 in Table II ranged between about 600 g/min and about 1300 g/min.

TABLE I

Temperature and flow rate of urethane precursors

| Stream | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| B1 (MONDUR MR) | °F. | 75 | 75 | 62.5 | 100 | 50 | 87.5 | 100 | 112.5 |
|  | g/min | 100 | 100 | 100 | 100 | 100 | 100 | 100 | 100 |
| B2 (Conductive curatives) | °F. | 200 | 200 | 200 | 200 | 200 | 200 | 200 | 200 |
|  | g/min | 870 | 913 | 667 | 1008 | 616 | 1039 | 892 | 1157 |
| Total Flow Rate | g/min | 945 | 988 | 729.5 | 1108 | 666 | 1126.5 | 992 | 1269.5 |

TABLE II

Conductive curative compositions (Stream B2)

| | Ex. 1 | Ex. 2 | Ex. 3 | Ex. 4 | Ex. 5 | Ex. 6 | Ex. 7 | Ex. 8 |
|---|---|---|---|---|---|---|---|---|
| DESMOPHEN F-207-60A | 5.00 | — | — | 5.00 | 7.00 | — | 5.00 | 5.00 |
| PIOTHANE 3500 DEA | 2500.00 | 250.00 | 250.00 | 95.00 | 95.00 | 250.00 | 250.00 | 250.00 |
| Trimethanolpropane (TMP) | — | — | — | — | — | — | 0.500 | 0.800 |
| Triisopropylamine (TIPA) | — | — | — | — | — | — | 0.500 | — |
| Butanediol (XB) | — | — | — | — | — | — | 1.20 | 0.80 |
| 10 wt % LiClO$_4$/TBEP | 120.00 | 25.00 | — | — | — | 25.00 | 15.00 | — |
| LiClO$_4$ | 170.00 | 17.50 | 10.00 | 2.00 | 22.00 | 17.00 | 18.00 | 25.00 |
| DABCO 33LV | 3.50 | 0.68 | 0.51 | 0.10 | 0.90 | 0.60 | 0.70 | 0.40 |
| STABAXOL P200 | 15.00 | 3.50 | — | — | 4.00 | 2.00 | 2.50 | 1.50 |
| BHT | 10.00 | 0.20 | 0.2 | — | 0.25 | — | 0.40 | 0.50 |
| TINUVIN 328 | 20.00 | 0.40 | — | 0.5 | 0.65 | — | 0.80 | 1.0 |

DESMOPHEN F207-60A is a polyester polyol available from Bayer MaterialScience. PIOTHANE 3500 DEA is a polyester polyol available from Panolam Industries International, Inc. DABCO 33LV is a catalyst available from Air Products. STABAXOL P200 is a hydrolysis stabilizer available from Rein Chemie Rheinaur GmbH. BHT is an antioxidant available from BASF Corporation. TINUVIN 328 is a UV light stabilizer available from BASF Corporation.

The urethane precursors (Stream B1 and Stream B2) were flowed to a mixing head heated to a temperature of 150° F., and poured into a seven-cavity steel roller mold heated to 200° F. Cube molds (1.3"×1.3"×0.5") were also filled with the urethane precursors. Steel shafts in the roller mold were pre-coated with a conductive adhesive as described herein and pre-baked at 260° F. for at least two hours. The partially cured, solid urethane was de-molded after 10 to 45 minutes, placed in an oven between 180° F. and 220° F., and post-cured for a length of time between 8 hours and 16 hours. Rollers were then fabricated by both rough grinding and finish grinding. The rollers were then top coated with a moisture curing, urethane top coating material or a moisture curing, silicone top coating material. A thickness of the resulting top coat was between about 5 μm and 25 μm. Hardness and resistivity of the finished rollers are listed in Table III.

TABLE III

Properties (on cube) for Finished Rollers

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Hardness (Shore A) on cube | 20A | 17A | 25A | 27A | 29A | 18A | 24A | 15A |
| Volume resistivity (Ω·cm) | 7.0E4 | 5.1E4 | 1.2E5 | 5.7E4 | 5.3E4 | 8.5E4 | 1.2E5 | 4.5E4 |

As seen in Table III, the hardness on cube of the urethane formulations of Examples 1-8 range from 15 Shore A to 29 Shore A. The volume resistivity of the urethane formulations of Examples 1-8 ranges from 5.1E4 Ω·cm to 8.5E4 Ω·cm, or between about 5E4 Ω·cm and about 9E5 Ω·cm.

Comparative Example

Urethanes formed with diisocyanate MDI (Urethane L) and polymeric MDI (Urethane P) were prepared according to the process described in the EXAMPLES above. For Urethane L, Stream B1 was ISONATE 143L, a polycarbodiimide-modified diphenylmethane diisocyanate, which includes diphenylmethane diisocyanate (OCN—R—NCO) and a polycarbodiimide, capable of adduct formation, as shown below.

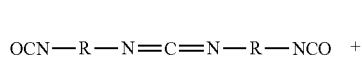

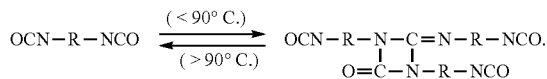

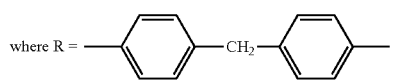

For Urethane P, Stream B1 was MONDUR MR LIGHT, a polymeric diphenylmethane diisocyanate including a general structure shown below:

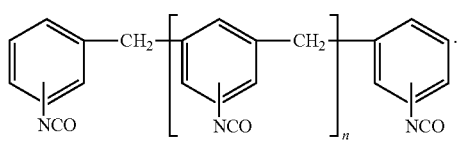

Tables IV and V list components in parts by weight of the conductive curative solutions in Stream B2 used to form Urethane L and Urethane P, respectively. Table VI lists parts by weight of Streams B1 and B2 for Urethane L and Urethane P.

TABLE IV

Conductive curative composition for Urethane L
B1 Stream: ISONATE 143L

| B2 Stream Components | Parts by weight |
| --- | --- |
| PLURACOL P380 | 100 |
| Trimethylol propane (TMP) | 6.30 |
| ACCLAIM 4220N | 782.4 |
| LiClO$_4$ | 54.70 |
| FOMREZ UL-29 | 0.107 |

PLURACOL P380 is a polyether polyol (molecular weight 6500) available from BASF Corporation. ACCLAIM 4220N is a polyether polyol (molecular weight 4000) available from Bayer MaterialScience. FOMREZ UL-29 is a catalyst available from Witco.

TABLE V

Conductive curative composition for Urethane P
B1 Stream: MONDUR MR LIGHT

| B2 Stream Components | Parts by weight |
| --- | --- |
| PIOTHANE 3500 DBA | 250 |
| LiClO$_4$ | 17.50 |
| 10 wt % LiClO$_4$ in TBEP | 50 |
| FOMREZ UL-29 (catalyst) | 0.15 |

As described with respect to Table II, PIOTHANE 3500 DEA is a polyester polyol available from Panolam Industries International, Inc.

TABLE VI

Urethane L and Urethane P composition

| Urethane | Stream B1 (parts by weight) | Stream B2 (parts by weight) |
| --- | --- | --- |
| Urethane L | 100 | 1121 |
| Urethane P | 100 | 1627 |

Shore A hardness of Urethanes L and P was assessed by ASTM D2240. Tensile strength and elongation of Urethanes L and P were assessed by ASTM D412. ASTM D624 was used to assess Die C tear strength. ASTM D395 Method B was used to assess compression set at room temperature (RT, about 72° F. in this example) and 157° F. Peel strength at an angle of 90° on a smooth ceramic surface with a head speed of 9.5 cm/min was assessed with ASTM D429 Method B. Results are shown in Table VII.

TABLE VII

Properties of Urethane L and Urethane P

| Urethane | Adhesion Force (g/cm) | Tensile strength (psi) | Elongation (%) | Hardness (Shore A) | Compression set (%) RT | Compression set (%) 157° F. |
| --- | --- | --- | --- | --- | --- | --- |
| Urethane L | 311 | 228 | 732 | 26 | 1.63 | 12.41 |
| Urethane P | 12.6 | 220 | 570 | 24 | 0.82 | 2.83 |

As seen in Table VII, the compression set for Urethane L is about two times the compression set for Urethane P at room temperature, and is about five times the compression set for Urethane P at 157° F. The adhesion force, a measure of tackiness, is about 25 times more for Urethane L than for Urethane P.

A number of embodiments have been described. Nevertheless, it will be understood that various modifications may be made without departing from the spirit and scope of the disclosure. Accordingly, other embodiments are within the scope of the following claims.

What is claimed is:

1. A conductive thermoset urethane formed from a mixture comprising:
   a polymeric diphenylmethane diisocyanate;
   a soft segment comprising a polyester polyol, a polyester polyamine, or a combination thereof;
   a hard segment comprising a polyol, a polyamine, or a combination thereof; and
   a metal salt,
   wherein the weight ratio of the soft segment to the hard segment is at least 100, and the conductive thermoset urethane has a compression set of less than 5% at room temperature.

2. The conductive thermoset urethane of claim 1, wherein the weight ratio of the soft segment to the hard segment is at least 200.

3. The conductive thermoset urethane of claim 1, wherein the mixture further comprises a liquid conductive additive comprising an additional metal salt dissolved in a solvent.

4. The conductive thermoset urethane of claim 3, wherein the additional metal salt is an alkali metal salt or a transition metal salt.

5. The conductive thermoset urethane of claim 3, wherein the solvent is selected from the group consisting of tris(2-butoxyethyl phosphate), tri(β-chloroethyl) phosphate, and tri(β-chloropropyl) phosphate.

6. The conductive thermoset urethane of claim 1, wherein the compression set of the conductive thermoset urethane is as low as 0.5% at room temperature or as low as 3% at 157° F.

7. The conductive thermoset urethane of claim 1, wherein the hardness of the conductive thermoset urethane is as low as 15 Shore A on cube.

8. The conductive thermoset urethane of claim 1, wherein the volume resistivity of the conductive thermoset urethane is as low as 5E4 Ω·cm.

9. The conductive thermoset urethane of claim 1, wherein the soft segment has an equivalent weight of at least 900.

10. The conductive thermoset urethane of claim 1, wherein the hard segment has an equivalent weight of less than 200.

11. The conductive thermoset urethane of claim 1, wherein the metal salt comprises an alkali metal salt or a transition metal salt.

12. The conductive thermoset urethane of claim 1, wherein a weight percentage of the metal salt in the conductive thermoset urethane is between 0.1 wt % and 8 wt %.

13. The conductive thermoset urethane of claim 1, wherein the adhesion force of the conductive thermoset urethane is between 5 g/cm and 50 g/cm.

14. The conductive thermoset urethane of claim 1, wherein the soft segment is selected from the group consisting of a polyester polyol, a polyester polyamine, or a combination thereof.

15. The conductive thermoset urethane of claim 1, wherein the hard segment is selected from the group consisting of a polyol, a polyamine, or a combination thereof.

16. A roller for a printing or paper handling device, the roller comprising:
   a cylindrical metal core; and
   a conductive thermoset urethane formed around the cylindrical metal core, the conductive thermoset urethane formed from a mixture comprising:
      a polymeric diphenylmethane diisocyanate;
      a soft segment comprising a polyester polyol, a polyester polyamine, or a combination thereof;
      a hard segment comprising a polyol, a polyamine, or a combination thereof; and
      a metal salt,
      wherein the weight ratio of the soft segment to the hard segment is at least 100, and the conductive thermoset urethane has a compression set of less than 5% at room temperature.

17. The roller of claim 16, wherein roller comprises an adhesive coating between the cylindrical metal core and the conductive thermoset urethane.

18. The roller of claim 16, further comprising a top coating applied to the surface of the conductive thermoset polyurethane.

19. The roller of claim 16, wherein the roller is selected from the group consisting of developer rollers, charge rollers, exit rollers, toner add rollers, and bias transport rollers.

* * * * *

UNITED STATES PATENT AND TRADEMARK OFFICE
CERTIFICATE OF CORRECTION

PATENT NO. : 8,515,318 B2  
APPLICATION NO. : 13/045011  
DATED : August 20, 2013  
INVENTOR(S) : Albert C. Chiang Page 1 of 1

It is certified that error appears in the above-identified patent and that said Letters Patent is hereby corrected as shown below:

Title page, column 2 (Abstract), line 7, delete "15 A" and insert -- 15A --.

Signed and Sealed this  
Twenty-second Day of April, 2014

Michelle K. Lee  
*Deputy Director of the United States Patent and Trademark Office*